Sept. 15, 1931.  A. JUNEAU  1,823,830
SPEED RESPONSIVE DEVICE
Filed Nov. 22, 1928  4 Sheets-Sheet 1
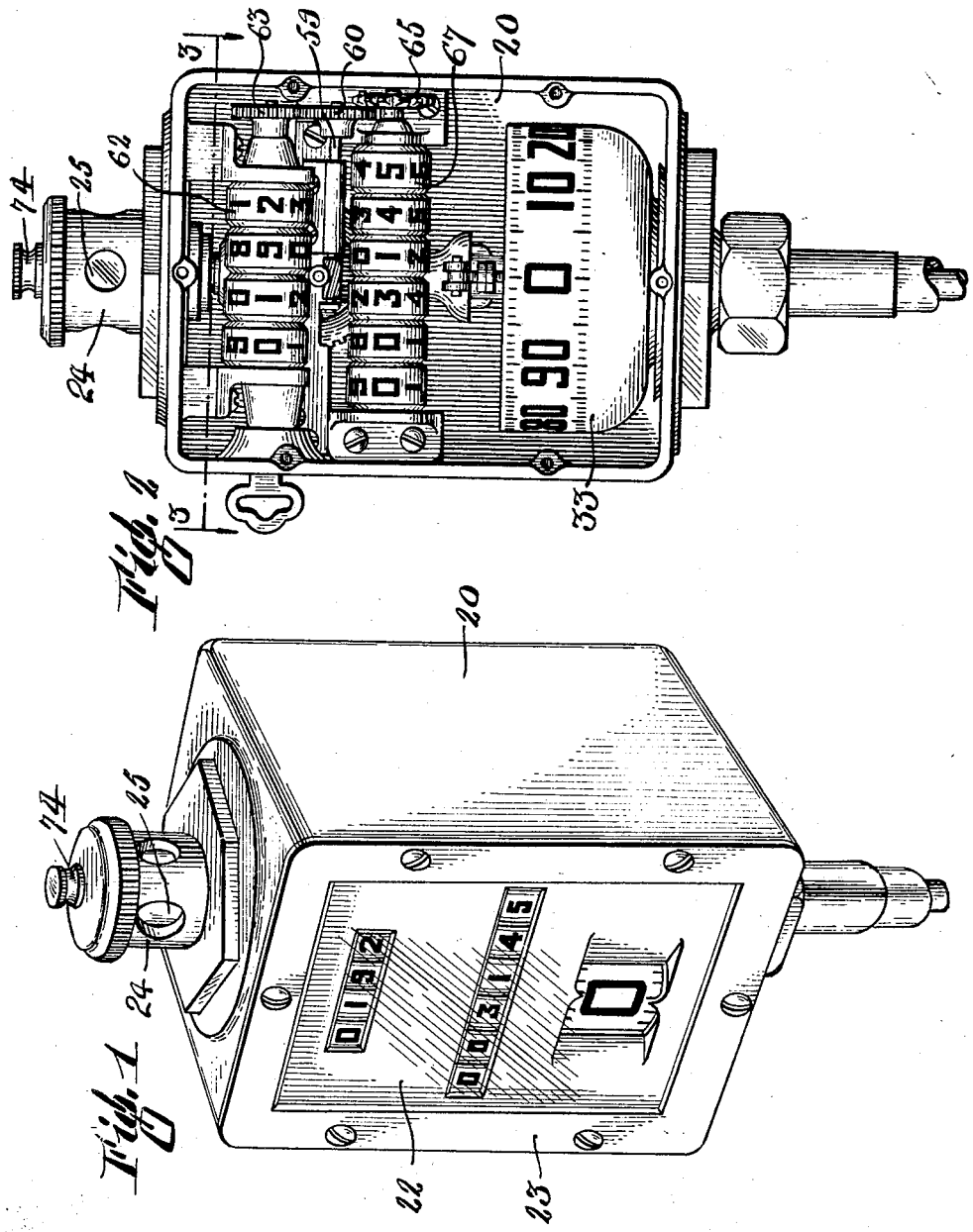
Inventor
Armand Juneau
By Marion & Marion
Attorneys Sept. 15, 1931.  A. JUNEAU  1,823,830
SPEED RESPONSIVE DEVICE
Filed Nov. 22, 1928  4 Sheets-Sheet 2
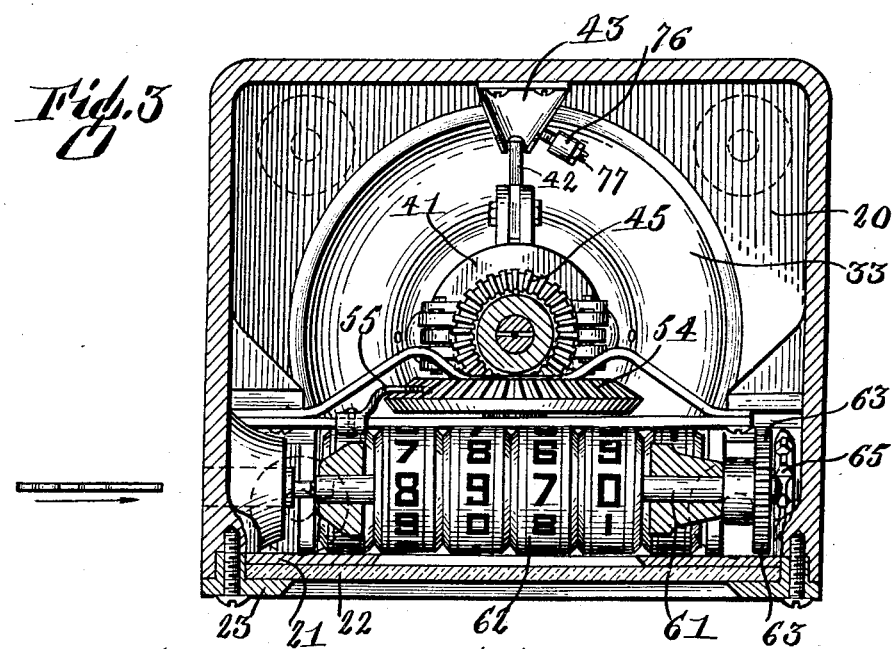
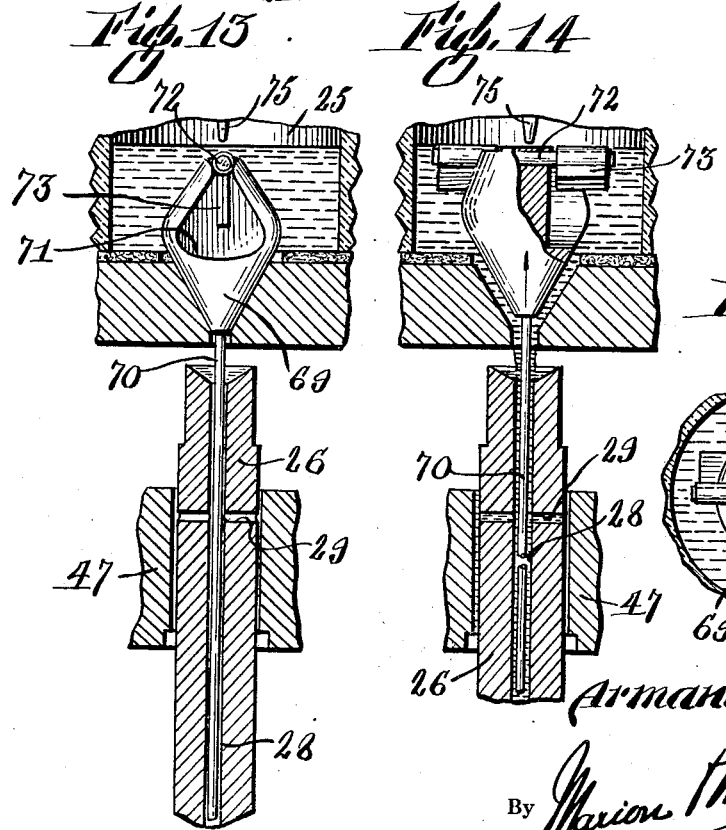
Armand Juneau
Inventor

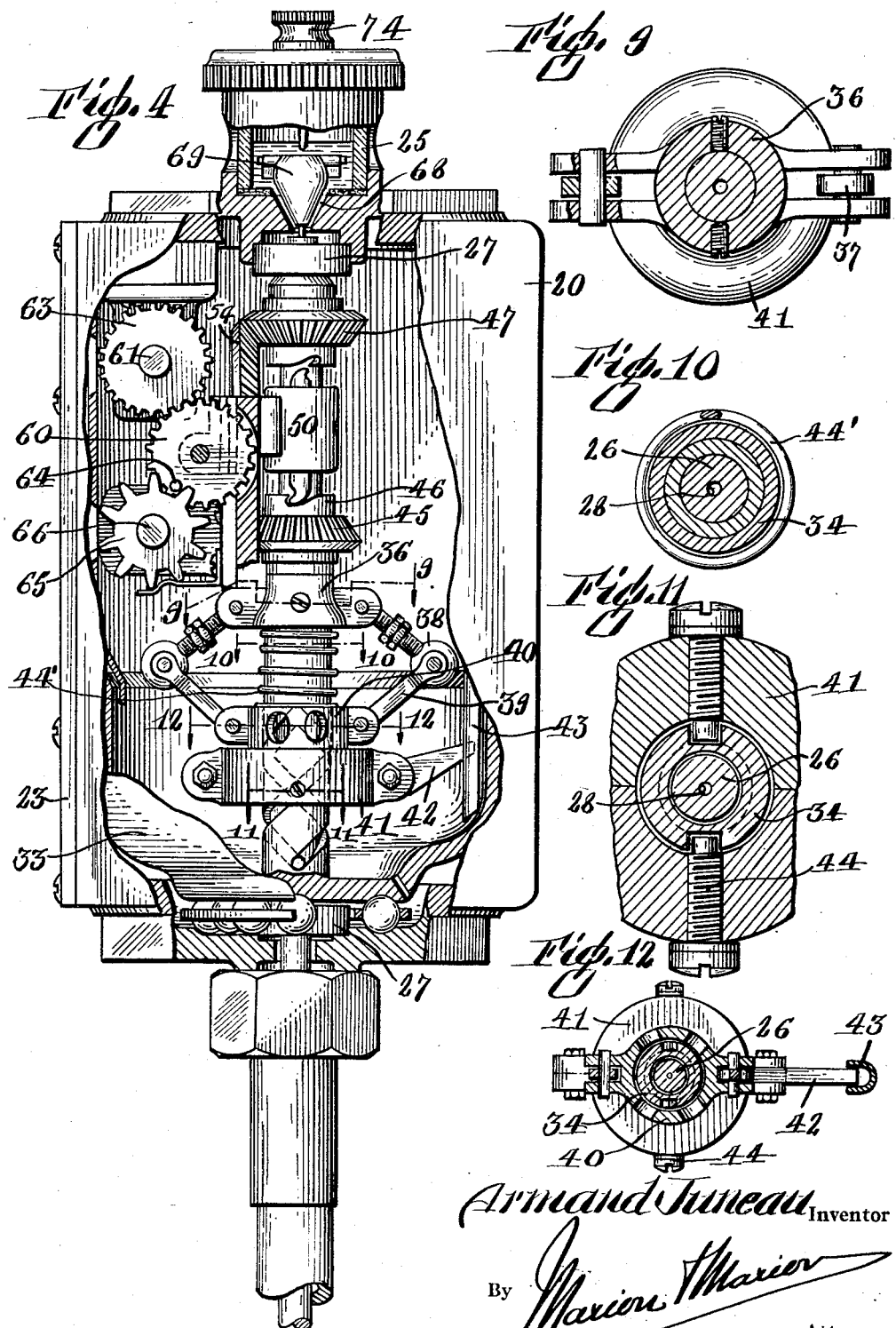

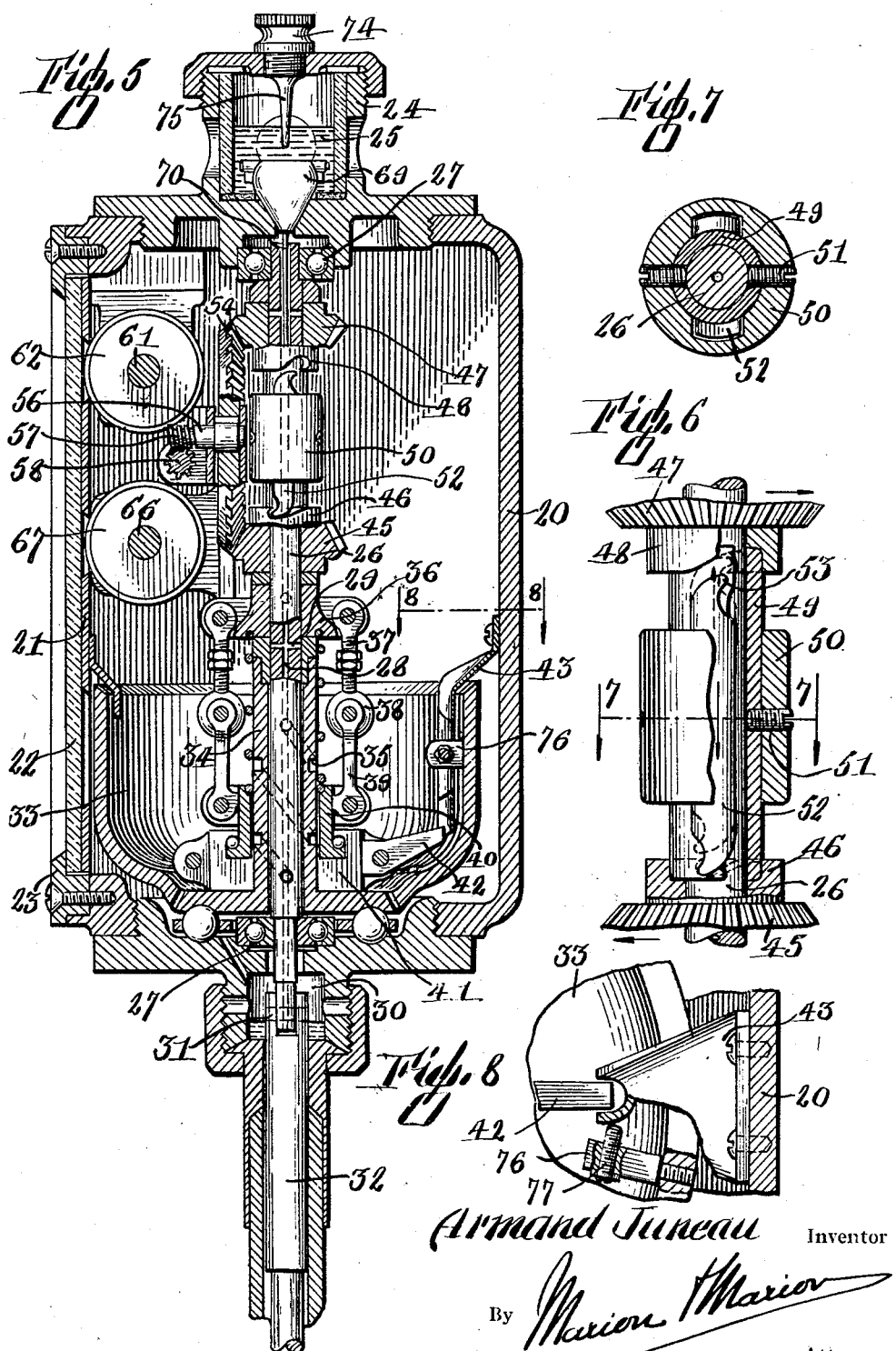

Patented Sept. 15, 1931

1,823,830

UNITED STATES PATENT OFFICE

ARMAND JUNEAU, OF MONTREAL, QUEBEC, CANADA

SPEED RESPONSIVE DEVICE

Application filed November 22, 1928. Serial No. 321,112.

The present invention relates to improvements in speed responsive devices and has particular reference to a speed indicating apparatus for locomotives and similar vehicles.

An important object of the invention is the provision of an indicating speedometer designed to indicate the speed of a vehicle in its forward as well as its reverse movement.

Still another object of the invention is the provision of a speedometer constructed so that the mechanism operates at an unusually low speed.

A further object of the invention is the provision of an indicating speedometer having key resettable trip as well as total mileage counters designed to indicate the mileage travelled during both the forward and reverse movement of the vehicle.

A still further object of the invention is the provision of a speedometer designed so that the speed indicating mechanism is operated directly from the operating shaft thereof.

Another object of the invention is the provision of a speedometer of the above character which will be compact and durable in construction.

Still another object of the invention is the provision of a speedometer of the above type which will be extremely reliable and accurate in operation.

A still further object of the invention is the provision of a speedometer having means for completely and effectively lubricating the movable parts thereof.

Other objects and advantages of the invention will become apparent as the description progresses.

In the accompanying drawings forming a part of this specification and in which like reference characters are employed to designate corresponding parts throughout the same:

Figure 1 is a perspective view of the assembled apparatus in operative position, Figure 2 is a front view with the forward casing cover removed, Figure 3 is a horizontal section taken on the line 3—3 of Figure 2, Figure 4 is an enlarged side elevational view with a portion of the casing broken away.

Figure 5 is a central vertical section through the apparatus,

Figure 6 is an enlarged elevation of actuating mechanism,

Figure 7 is a transverse section taken on the line 7—7 of Figure 6,

Figure 8 is an enlarged fragmentary section taken on the line 8—8 of Figure 5,

Figure 9 is a transverse section taken on the line 9—9 of Figure 4,

Figure 10 is a similar view taken on the line 10—10 of Figure 4,

Figure 11 is a similar view taken on the line 11—11 of Figure 4,

Figure 12 is a similar view taken on the line 12—12 of Figure 4,

Figure 13 is a vertical fragmentary section of the lubricating mechanism,

Figure 14 is a side view of the same, and

Figure 15 is a top plan view of the same.

Referring to the drawings, wherein for the purpose of illustration is shown a preferred embodiment of the invention, the numeral 20 indicates the speedometer casing which is vertically elongated and rectangular in cross section. The front of the casing is provided with a removable front plate 21 having rectangular sight openings, against which is positioned a glass plate 22 held against displacement by a marginal frame 23. On the top of the casing is formed a perforated cylindrical housing 24 in which is disposed a cylindrical, preferably glass, lubricant container 25 forming an oil chamber having communication with the interior of the casing.

Journaled in a vertical position in the centre of the casing, for rotatable operation, is a main drive shaft 26 supported in ball bearings 27 disposed in the upper and lower portions of the casing. Through the centre of the shaft 26 is formed a lubricating channel 28 extending through the entire length of the shaft and communicating at intervals with lateral passages 29 extending through the sides thereof. The lower extremity of the drive shaft 26 extends through an aperture in the bottom of the casing and is disposed in a lubricating compartment 30. This lower extremity is connected by means of a pin 31 with a flexible operating shaft 32 connected with a speed responsive element of the vehicle.

Rotatably supported in the bottom of the casing is a speed indicating dial 33 embodying a drum shaped member provided at its centre with an axially extending tubular sleeve 34. The sleeve 34 is mounted for rotary movement about the shaft 26 and is formed at its exterior with a pair of single coil parallel spiral grooves 35. The dial 33 is disposed for rotary speed indicating movement about the main shaft and is actuated by centrifugal actuating mechanism.

The centrifugal actuating mechanism embodies an annular collar 36 fixed on the intermediate portion of the drive shaft by means of a transversely extending pin. The collar 36 is provided with oppositely extending bearing ears adapted to form bearings for an opposed pair of links 37. At the lower ends, the links 37 are formed with weighted pivot bearings 38 pivotally connected with the upper ends of a lower pair of links 39. The lower ends of the links 39 are pivotally connected with opposed sides of a collar 40 positioned for rotary and sliding movement about the sleeve 34. The lower extremity of the collar 40 is formed with an annular lateral flange arranged to engage an angular groove in a ring 41 disposed about the sleeve 34 and adapted for axial reciprocating movement. Attached to the ring 41, and extending radially therefrom, is a rigid arm 42 disposed to engage a vertical, rigidly mounted channel guide member 43. The ring 41 carries a pair of radially extending set screws 44 extending through opposed sides thereof so that their inner ends engage the spiral grooves 35. A helical compression spring 44' is disposed about the upper portion of the sleeve 34 bearing against the collars 36 and 40 and tending to normally urge the lower collar 40 and ring 41 downwardly against the centrifugal action of the weighted links.

Thus, during the rotary operation of the drive shaft 26 the weighted bearings 38 of the centrifugal actuating mechanism will extend laterally in correspondence with the speed of the shaft, slidably elevating the ring 41 and revolving the dial 33 to indicate the rotary speed of the shaft in miles per hour.

Rotatably mounted on the shaft 26, above the collar 36, is a toothed bevel gear 45 having an upwardly extending hub flange 46 formed with spaced notches in the upper edge thereof. A complementary bevel gear 47 is loosely mounted on the drive shaft in a position spaced from and above the gear 45, this complementary gear being provided with a depending annular flange 48 also formed with spaced notches in the lower edge.

The gears 45 and 47 are retained in spaced predetermined positions by means of an intermediate spacing sleeve 49 positioned about the drive shaft. A collar 50 is fitted over the intermediate portion of the sleeve 49, this collar and the sleeve 49 being rigidly secured to the shaft 26 by means of a set screw 51. The interior surface of the collar 50 is machined to form a pair of opposed axially extending grooves designed to slidably accommodate a pair of longitudinal key members 52 designed to project beyond the upper and lower edges of the collar and formed at the ends with angular lugs 53 adapted to engage the notches in the lower gear flange 46 or the upper gear flange 48, according to direction of rotation.

The complementary bevel gears 45 and 47, mounted to rotate horizontally about the drive shaft, engage the upper and lower portions of a master bevel gear 54 journaled to rotate in a vertical plane. A pivotal pawl 55, connected with a frame in the casing, is disposed to permanently engage the teeth of the gear 54 so that the movement of this gear is limited to revolve in a predetermined direction, in the present instance in a clockwise rotary movement. To the centre of the gear 54 is secured a stub shaft 56 having formed at its outer forward extremity a worm 57 disposed to constantly mesh with a driven worm gear 58. The worm gear 58 is mounted at the inner extremity of a transverse shaft 59 carrying on its outer end a spur gear 60.

In the upper forward portion of the casing is mounted a key resettable trip mileage counter mechanism embodying a horizontal shaft 61 journaled transversely in the casing and carrying intermediate its ends a plurality of annular indicating dials 62. On the periphery of each dial are marked, in any suitable manner, consecutive designating numerals running from zero to nine, said dials being mounted to indicate the mileage for a specified trip of the vehicle. On one end of the shaft 61 is fixed a spur gear 63 disposed to mesh with the gear 60 responsive to the rotary operation of the drive shaft 26.

On its outer face, the gear 60 carries a laterally projecting pin 64 disposed adjacent its periphery and arranged to engage a toothed sprocket 65 secured on the end of an intermediate horizontal indicator shaft 66. The shaft 66 is journaled transversely in the casing below the shaft 61 and carries on its intermediate portion annular rotatable dials 67 adapted to provide a total mileage counter.

Communication between the oil chamber or reservoir 25 and the upper end of the drive shaft channel is established through a passage of tapered form, as indicated at 68, adapted to form a seat for a conical valve member 69. Attached to and depending from the valve member 69 is an elongated stem 70 having a diameter less than the diameter of the shaft passage 28 and disposed in the upper portion thereof. The valve member 69 is formed with opposed pockets 71 and carries on its upper extremity a transversely extending shaft 72 having the ends projecting laterally from the valve to form pivot bearings for a pair of flat vanes 73 arranged so that their inner portions are disposed in the pockets 71.

The top of the reservoir is formed with a threaded opening adapted to receive therein a closure cap 74 which carries a depending stem 75. When the cap is in closed position, the stem is disposed vertically in the reservoir and terminates above the valve 69 when the mechanism is inoperative and limits the upward movement of the valve during the operation of the mechanism.

During the rotary operation of the main drive shaft 26, the valve stem 70 will be rotated by the friction of the lubricant disposed between the stem and the inner wall of the lubricant passage 28 simultaneously revolving the conical valve 69 and the pivoted vanes 73 carried thereon. As the valve is rotated, the vanes 73 are swung from vertical depending positions to angular positions approaching the horizontal disposed in opposed directions and are rotated in the lubricant within the reservoir. The angular arrangement of the vanes will elevate the valve 69 and stem 70 in correspondence with the rotary speed of the drive shaft so that the valve is raised from its seat and a sufficient amount of lubricant delivered into the lubricating passage of the drive shaft and rotatable members associated therewith to provide an automatic lubricating apparatus which will constantly supply sufficient lubricant required to properly lubricate the speedometer mechanism. This construction provides a built-in lubricating mechanism designed to supply lubricant in predetermined quantities proportional to the operating speed of the apparatus and to automatically cut off the supply when the apparatus is inactive.

In order to permit accurate rotatable adjustment of the drum dial 33 to maintain an accurate setting thereof, an inwardly projecting bracket 76 is attached to the peripheral portion of the drum and carries a transversely adjustable set screw 77 designed to engage the guide member 43 attached to the casing and offset to project axially within the dial. If, for any reason, the indicating characters on the drum dial should fail to accurately register with the index thereof, the discrepancy can be readily compensated for by transverse adjustment of the set screw 77 when the apparatus is in inactive position.

In operation, the flexible connecting shaft 32 is associated with the vehicle axle or other speed responsive element to rotate the main drive shaft 26 during the travelling movement of the vehicle. When the vehicle is travelling in a forward direction, the drive shaft will be rotated in a clockwise direction. During the revolution of the drive shaft, the collar 26 fixed thereon will be rotated with the shaft and will simultaneously rotate the centrifugal actuating mechanism causing lateral extension of the weights 38 by centrifugal action.

As the weights 38 are laterally extended, the lower collar 40 and ring 41 associated therewith will be axially elevated in balanced correspondence with the rotary speed of the drive shaft. The axial movement of the ring 41 will produce a predetermined rotary movement of the drum dial 33 which will accurately indicate through the lower slot in the forward casing wall the actual travelling speed of the vehicle in miles per hour. When the vehicle is travelling in reverse or backward movement, the drive shaft 26 will be rotated in reverse direction and will revolve the centrifugal actuating mechanism in correspondence therewith. The resultant action of the centrifugal actuating mechanism is, however, the same, axially reciprocating the ring 41 and rotating the dial 33 to properly indicate the travelling speed of the vehicle.

During the forward operative movement of the vehicle, the clockwise movement of the drive shaft will cause the axially slidable keys 52 to engage the flange of the bevel gear 45, due to the design of the lugs at the lower ends of the keys and the form of the key receiving notches in the gear flange. Thus, the gear 45 will be driven directly with the shaft during its forward or clockwise movement. Reverse rotary operation of the drive shaft will cause the keys to shift axially in the collar 50 so that the opposed ends of the keys will engage the notches 48 in the complementary gear 47. The gears 45 and 47 being constantly in mesh with the master gear 54 will be rotated in a given direction, that is, the gear 45 rotating always in a clockwise movement, while the gear 47 will rotate in counter-clockwise movement. This gear structure will thus operate the trip and total mileage counters in a continuous direction so that these mechanisms will register the total traveling movement of the vehicle as the sum of its forward and reverse operation. Furthermore, the apparatus is so constructed as to accurately indicate the travelling speed and the mileage counters whether employed with the operating shaft disposed in a vertical position as illustrated or modified so that this shaft is disposed horizontally or at an inclined position.

It is to be understood that the form of my invention herein shown and described is to be taken as a preferred example of the same, and that various changes as to the shape, size, and arrangement of parts may be resorted to without departing from the spirit of the invention or the scope of the subjoined claim.

Having thus described my invention, I claim:—

In a speedometer, the combination of a shaft adapted to rotate in any direction, a drum shaped dial adapted to rotate concentrically around the shaft, a sleeve journaled over the shaft and having two diametrically opposed screw threads, said sleeve being integral with the dial and in the center thereof a member secured to the shaft and above the top of the sleeve, a similar member slidable over the sleeve, links on each of said members, each corresponding link of each member terminating in a weighted centrifugal member, a spring between the fixed upper member and the slidable lower one tending to force the lower member in a downward position, a third fixed member journaled over the second member, an arm extending from said third member at right angles to the axis of rotation, guide means mounted exteriorly to the drum for preventing rotation of the third member, and means in said third member for engaging the threads of the sleeve and causing movement of the dial.

In witness whereof I have hereunto set my hand.

ARMAND JUNEAU.